(12) United States Patent
Jiang et al.

(10) Patent No.: US 7,797,259 B2
(45) Date of Patent: Sep. 14, 2010

(54) SYSTEM FOR TEMPORAL PREDICTION

(75) Inventors: Qin Jiang, Woodland Hills, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 690 days.

(21) Appl. No.: 11/786,949

(22) Filed: Apr. 12, 2007

(65) Prior Publication Data

US 2008/0256009 A1    Oct. 16, 2008

(51) Int. Cl.
*G06E 1/00* (2006.01)
(52) U.S. Cl. .......................................... 706/21; 706/27
(58) Field of Classification Search .................. 706/27, 706/21
See application file for complete search history.

(56) References Cited

U.S. PATENT DOCUMENTS

| | | | | |
|---|---|---|---|---|
| 5,751,899 A | * | 5/1998 | Large et al. | 704/207 |
| 6,625,569 B2 | * | 9/2003 | James et al. | 702/183 |
| 7,080,290 B2 | * | 7/2006 | James et al. | 714/47 |
| 2007/0213786 A1 | * | 9/2007 | Sackellares et al. | 607/45 |

OTHER PUBLICATIONS

Guoqiang Zhang, B. Eddy Patuwo, Michael Y. Hu, Forecasting with artificial neural networks:: The state of the art, International Journal of Forecasting, vol. 14, Issue 1, Mar. 1, 1998, pp. 35-62.*
Sivakumar Bellie (1) ; Berndtsson Ronny (2) ; Persson Magnus (2). Monthly runoff prediction using phase space reconstruction = Prévision du débit mensuel par reconstruction dans l'espace des phases. Hydrological sciences journal. IAHS Press, Wallingford, ROYAUME-UNI. 2001, vol. 46, No. 3, pp. 377-387.*
Falco, I. D., Iazzetta, A., Natale, P., and Tarantino, E. 1998. Evolutionary Neural Networks for Nonlinear Dynamics Modeling. In Proceedings of the 5th international Conference on Parallel Problem Solving From Nature (Sep. 27-30, 1998). A. E. Eiben, T. Bäck, M. Schoenauer, and H. Schwefel, Eds. Lecture Notes in Computer Science, vol. 1498. S.*
Jun Zhang, K. C. Lam, W. J. Yan, Hang Gao, Yuan Li, Time series prediction using Lyapunov exponents in embedding phase space, Computers & Electrical Engineering, vol. 30, Issue 1, Jan. 2004, pp. 1-15.*

(Continued)

*Primary Examiner*—Donald Sparks
*Assistant Examiner*—David H Kim
(74) *Attorney, Agent, or Firm*—Tope-McKay & Assoc.

(57) ABSTRACT

Described is a system for temporal prediction. The system includes an extraction module, a mapping module, and a prediction module. The extraction module is configured to receive $X(1), \ldots X(n)$ historical samples of a time series and utilize a genetic algorithm to extract deterministic features in the time series. The mapping module is configured to receive the deterministic features and utilize a learning algorithm to map the deterministic features to a predicted $\hat{x}(n+1)$ sample of the time series. Finally, the prediction module is configured to utilize a cascaded computing structure having k levels of prediction to generate a predicted $\hat{x}(n+k)$ sample. The predicted $\hat{x}(n+k)$ sample is a final temporal prediction for k future samples.

30 Claims, 12 Drawing Sheets

OTHER PUBLICATIONS

J. Doyne Farmer and John J. Sidorowich. Predicting chaotic time series. Physical Review Letters. 59, 845-848 (Aug. 1987).*

Jyh-Shing Roger Jang, "ANFIS: Adaptive-Network-Based Fuzzy Inference System," IEEE Transactions on Systems, Man and Cybernetics, vol. 23, No. 3, pp. 665-685, 1993.

Nikola K. Kasabov and Qun Song, "DENFIS: Dynamic Evolving Neural-Fuzzy Inference System and Its Application for Time-Series Prediction," IEEE Transactions on Fuzzy Systems, vol. 10, No. 2, pp. 144-154, 2002.

T. Sauer, J.A. Yorke and M. Casdagli, "Embedology" Journal of Statistical Physics, vol. 65, pp. 579-616, 1981.

James B. Vitrano and Richard J. Povinelli, "Selecting dimensions and delay values for a time-delay embedding using a genetic algorithm," Proceedings of the Genetic and Evolutionary Computation Conference (GECCO 2001), 1423-1430, 2001.

J. Platt, "A Resource allocation network for function interpolation," Neural Computing, vol. 3, pp. 213-225, 1991.

* cited by examiner

| Methods | Neurons / Fuzzy Rules | NDEI for testing data |
|---|---|---|
| RAN | 24 | 0.170 |
| Online Model of DENFIS | 58 | 0.276 |
| Present Invention | 10 | 0.107 |

SYSTEM FOR TEMPORAL PREDICTION

FIELD OF INVENTION

The present invention relates to a method for temporal prediction and, more particularly, to a system for temporal prediction based on extraction and learning of phase-space representations.

BACKGROUND OF INVENTION

Time series analysis and signal estimation/prediction has been used in a variety of applications, including surveillance and data analysis. In time series analysis, one of the most challenging problems is to predict the signals generated by nonlinear dynamic systems since analytical models/functions for such signals may not exist, which means one cannot describe their functions with existing well-known functions. Most existing techniques use neural networks and fuzzy inference systems to approximate their functions in order to predict these kinds of signals.

Existing techniques for such systems include the Adaptive-Network-Based Fuzzy Inference System (ANFIS) and the Dynamic Evolving Neural-Fuzzy Inference System (DENFIS). ANFIS was described by Jyh-Shing Roger Jang in a publication entitled, "ANFIS: Adaptive-Network-Based Fuzzy Inference System," as published in *IEEE Transactions on Systems, Man, and Cybernetics*, vol. 23, no. 3, pp. 665-685, 1993. Alternatively, DENFIS was described by Nikola K. Kasabov and Qun Song in a publication entitled, "DENFIS: Dynamic Evolving Neural-Fuzzy Inference System and Its Application for Time-Series Prediction," as published in *IEEE Transactions on Fuzzy Systems*, vol. 10, no. 2, pp. 144-154, 2002.

The existing techniques are generally very complicated and are not flexible to the changes of prediction horizon of the signals. In both the ANFIS and DENFIS systems, the mapping networks are trained for a specific prediction step. Thus, in order to make a prediction for different prediction steps, their networks have to be retrained, making the systems ineffective for multi-step predictions. Additionally, the systems are unable to efficiently predict signals whose analytic functions may not exist, such as chaotic signals.

Thus, a continuing need exists for a system to predict signals (time series), including signals generated by linear/nonlinear dynamic systems and signals corrupted by random noises. A need also exists for a system that can make multi-step predictions without retraining its nonlinear mapping function.

SUMMARY OF INVENTION

The present invention relates to system for temporal prediction. The system comprises an extraction module, a mapping module, and a prediction module. The extraction module is configured to receive X(1), ... X(n) historical samples of a time series and utilize a search and optimization algorithm to extract deterministic features in the time series. The mapping module is configured to receive the deterministic features and utilize a learning algorithm to map the deterministic features to a predicted $\hat{x}(n+1)$ sample of the time series. Finally, the prediction module is configured to utilize a cascaded computing structure having k levels of prediction to generate a predicted $\hat{x}(n+k)$ sample. The predicted $\hat{x}(n+k)$ sample is a final temporal prediction for k future samples.

In another aspect, the extraction module is configured to extract the deterministic features as a multi-dimensional feature subset using the search and optimization algorithm. Each subset is extracted according to how many past samples are needed, a relative time sample number of each of the past samples with respect to a current time sample, and a weight of each of the past samples.

In yet another aspect, the mapping module is configured to use the deterministic features from the extraction module to construct a training set having elements. Each element in the training set comprises the multi-dimensional feature subset and a corresponding next sample from the known historical time series. The mapping module is further configured to use the training set to train the mapping module to transform the deterministic features into the predicted $\hat{x}(n+1)$ sample of the time series.

Additionally, the prediction module is configured to utilize a cascaded computing structure having k levels of prediction. Each level of prediction is configured to receive the X(1) through X(n) historical samples and the past $\hat{x}(n+1)$ sample through a $\hat{x}(n+k-1)$ sample. The prediction module further utilizes the extraction module and mapping module to generate a predicted $\hat{x}(n+k)$ sample, with the predicted $\hat{x}(n+k)$ sample being a final temporal prediction for k future samples.

In yet another aspect, the learning algorithm is a neural network.

Additionally, the search and optimization algorithm is a genetic algorithm.

Furthermore, the genetic algorithm is a nested genetic algorithm.

Finally, the present invention also includes a method and computer program product. The method comprises a plurality of acts for carrying out the operations described herein. Alternatively, the computer program product comprises computer-readable instruction means encoded on a computer-readable medium. The instruction means are executable by a computer for causing a computer to perform the operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a method for temporal prediction, and more particularly, to a system for temporal prediction based on extraction and learning of phase-space representations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Next, details of the present invention are provided to give an understanding of the specific aspects. Experimental results are thereafter provided to give the reader an understanding of the utility of the present invention. Finally, a conclusion is presented.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Attractor—The term "attractor" as used with respect to this invention refers to a state where the trajectories followed by the data stabilize after a period of time.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Phase-Space Representations—The term "Phase-Space Representations" as used with respect to this invention generally means the representation for the temporal data that has an attractor.

(2) Principal Aspects

The present invention has three "principal" aspects. The first is a system for temporal prediction. The temporal prediction system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
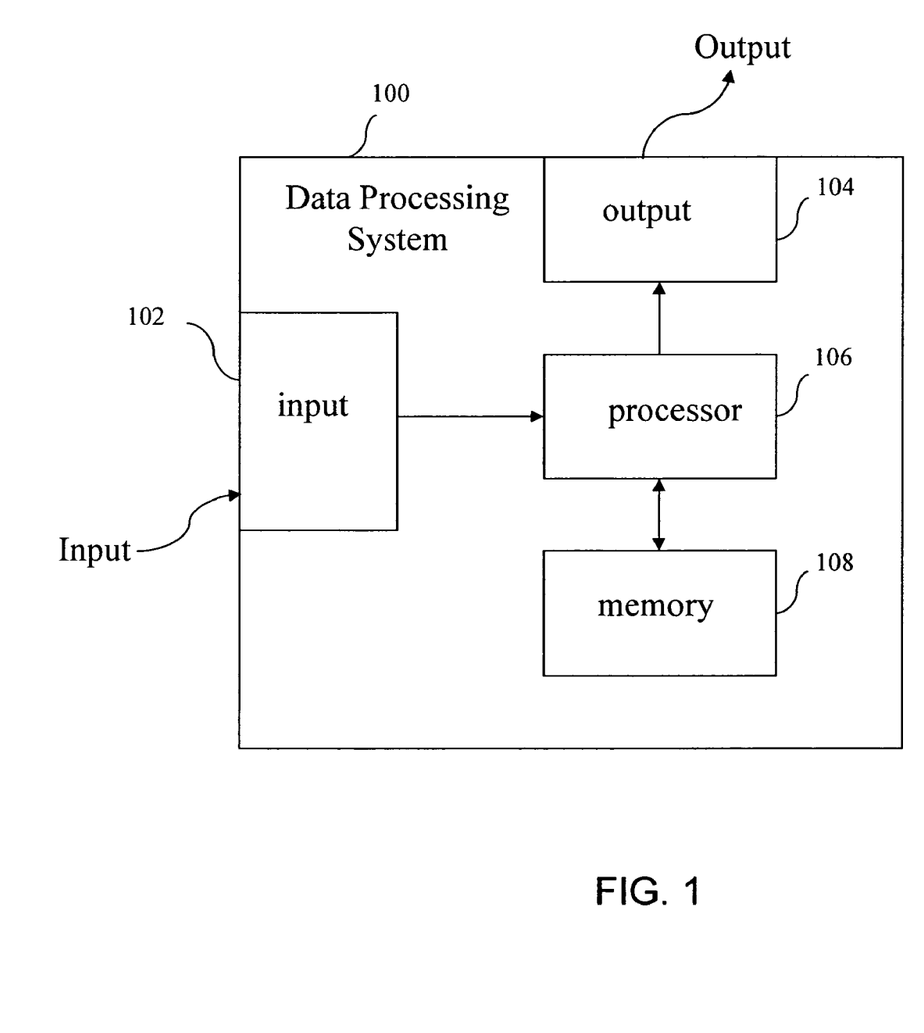
FIG. 1 is a block diagram depicting the components of a temporal prediction system according to the present invention.

A block diagram depicting the components of a temporal prediction system of the present invention is provided in FIG. 1. The temporal prediction system 100 comprises an input 102 for receiving historical samples of a time series. Note that the input 102 may include multiple "ports." Typically, input is received from at least one sensor. An output 104 is connected with the processor for providing a temporal system to other systems in order that a network of computer systems may serve as a temporal prediction system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
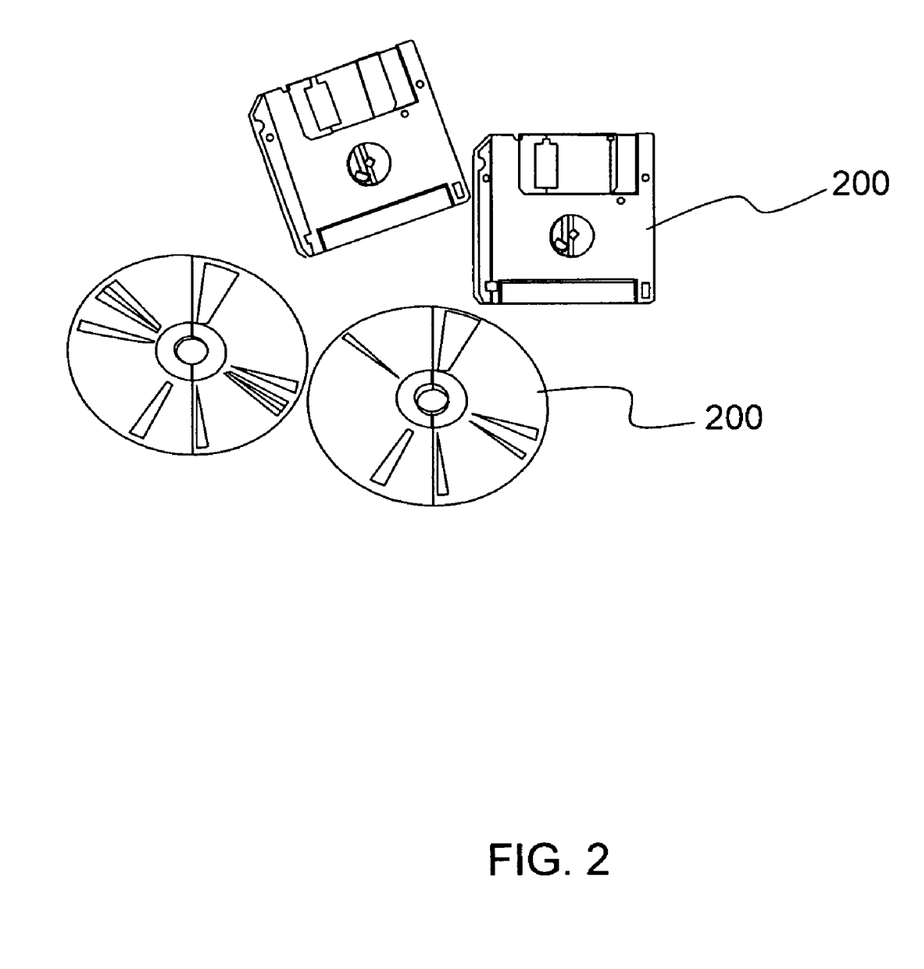
FIG. 2 is a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) Introduction

Predicting signals (time-sequences) generated by nonlinear dynamic systems is historically difficult to do. Difficulties exist because analytical models for these signals, such as chaotic signals, may not exist. Thus, model-based signal prediction is impossible for such signals. The present invention solves such a problem by providing an approach to predict signals generated by nonlinear dynamical systems. More specifically, the present invention is a method for temporal prediction based on extraction and learning of phase space representations (PSR). PSR can be used to study the behaviors of nonlinear dynamic signals, even though their analytical functions may not exist.

The present invention includes a technique to extract the PSR of a nonlinear dynamic signal from its time series (time observations) using a genetic algorithm. In principle, the mapping from the PSR to the signal function is a nonlinear mapping. Therefore, a neural network is used to approximate the nonlinear mapping since using neural networks are one of the best ways to approximate unknown nonlinear functions. With the PSR and the mapping network, multi-step predictions can be made of the nonlinear dynamic signal.

The present invention can be applied to signals generated by linear dynamical systems as well as signals corrupted by random noises. For example, the present invention can be used for time series analysis and signal estimation/prediction, such as for financial data analysis and biomedical signal analysis.

(4) Details of the Invention

Figure 3:
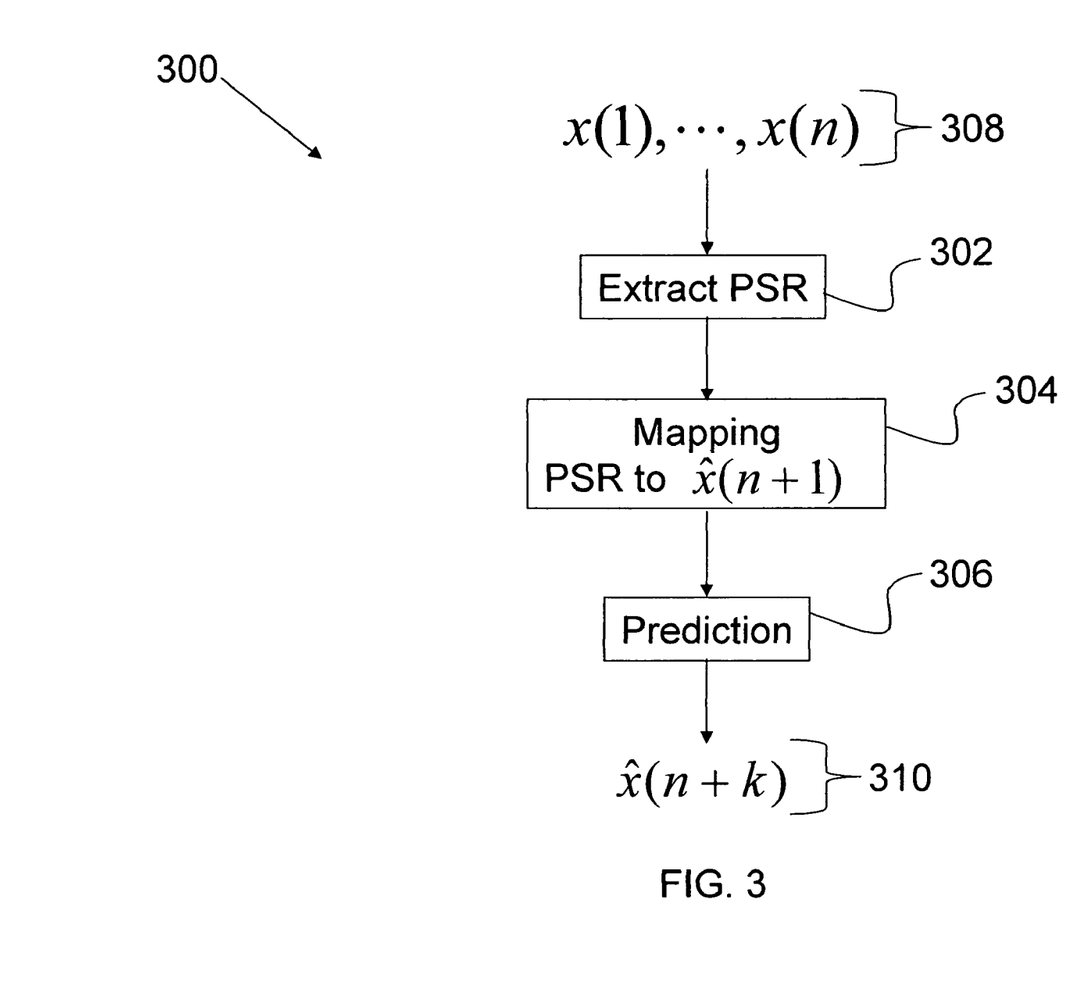
FIG. 3 is a flow chart of a non-linear dynamic temporal prediction system according to the present invention.

As shown in FIG. 3, the system for temporal prediction 300 includes an extraction module 302, a mapping module 304, and a prediction module 306. The extraction module is configured to receive X(1), . . . X(n) historical samples 308 of a time series and utilize a search and optimization algorithm (e.g., genetic algorithm) to extract deterministic features (e.g., phase-space representations PSR) in the time series. The mapping module 304 is configured to receive the deterministic features and utilize a learning algorithm to map the deterministic features to a predicted $\hat{x}(n+1)$ sample of the time series. Finally, the prediction module is configured to utilize a cascaded computing structure having k levels of prediction to generate a predicted $\hat{x}(n+k)$ sample 310. The predicted $\hat{x}(n+k)$ sample 310 is the final temporal prediction for k future samples. For clarity, each of the modules is further described below.

(4.1) Extraction Module

The extraction module 302 is used to extract deterministic features (e.g., PSR) from a time series. The system 300 first takes the transformed data and converts it into a temporal pattern with time embedding of historical samples 308.

Time embedding was described by T. Sauer, J. A. Yorke and M. Casdagli in "Embedology," *Journal of Statistical Physics*, vol. 65, pp. 579-616, 1981, which is incorporated in its entirety as though fully set forth herein. Time embedding uses the current sample and a set of appropriately chosen historical samples to create a temporal pattern (deterministic feature) or the PSR of the time series. It has been shown that even for non-stationary and chaotic deterministic signals, an appropriate PSR will form an attractor for the time series data. This essentially transforms the data from its chaotic form into a more predictable form. It is sometimes known as extracting order from chaos. In other words, the extraction module 302 extracts deterministic features in the time series. The PSR is extracted using a search and optimization algorithm, a non-limiting example of which includes a genetic algorithm (GA) formulation. Such a GA was described by James B. Vitrano and Richard J. Povinelli in "Selecting Dimensions and Delay Values for a Time-Delay Embedding Using a Genetic Algorithm," as published in *Proceedings of the Genetic and Evolutionary Computation Conference* (GECCO2001) (2001), 1423-1430, which is incorporated in its entirety as though fully set forth herein.

Figure 4A:
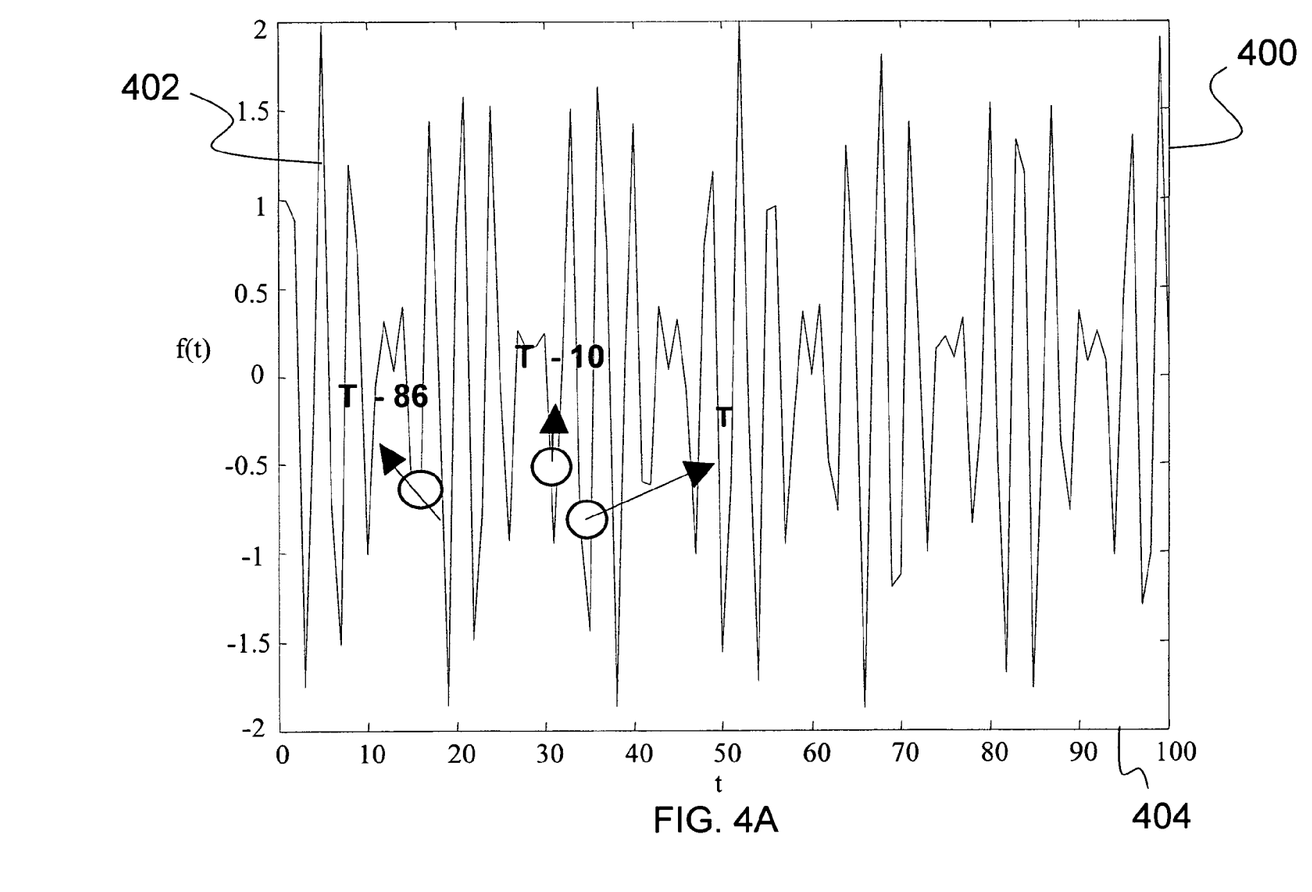
FIG. 4A is a graph illustrating an extraction of a Phase-Space Representation (PSR) using a Genetic Algorithm (GA) approach.
Figure 4B:
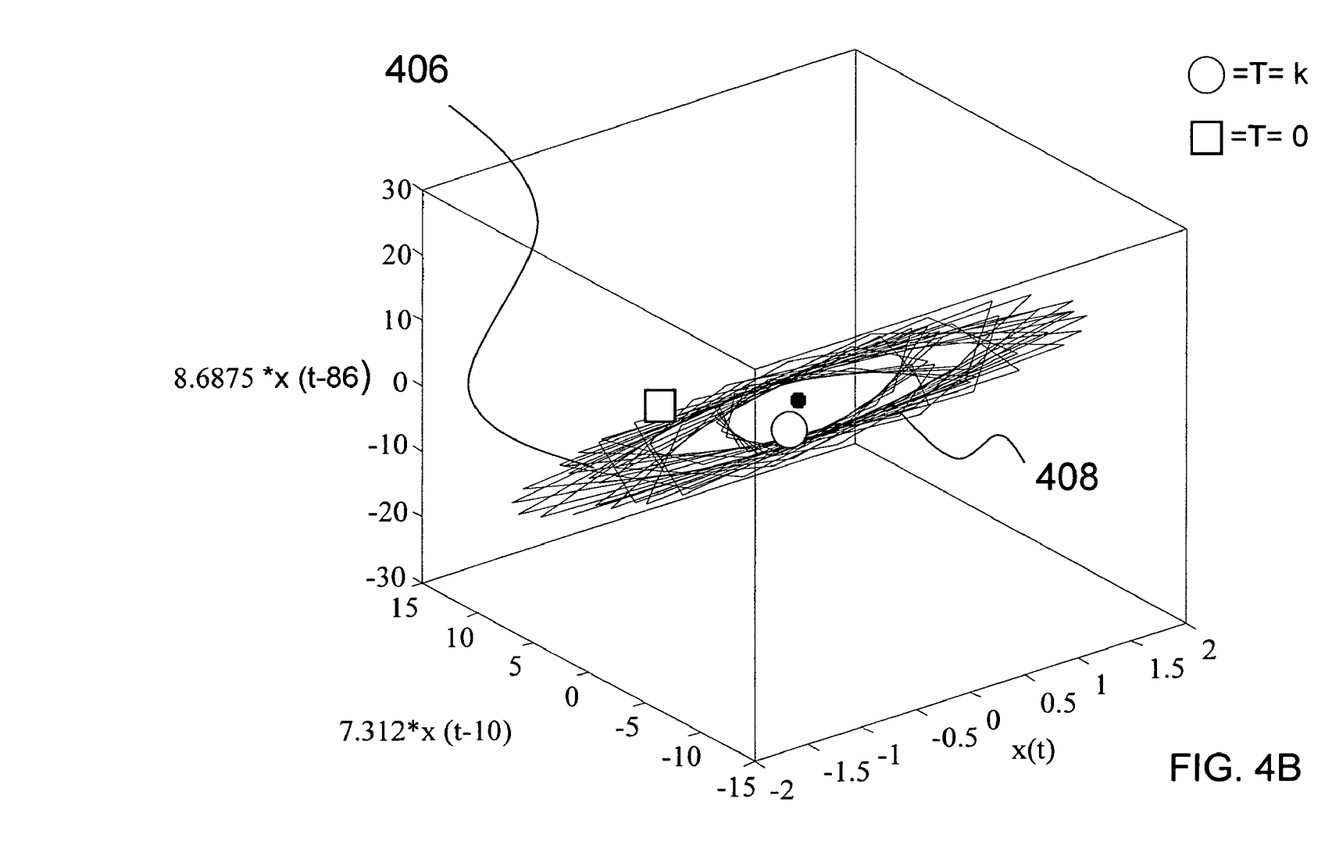
FIG. 4B is a graph illustrating an extraction of the PSR using the GA approach.

FIGS. 4A and 4B illustrate an example of extracting the PSR using a GA formulation. In this non-limiting example, the input signal is a periodic function, $f(t)=\sin(2\pi t)+\cos(1.6\pi t)+\text{noise}$. Using a GA search, the PSR P(t) extracted is three-dimensional (3D), resulting in P(t)={x(t), 7.3125*x(t−10), 8.6875*x(t−86)}, where * denotes multiplication and t denotes time. The embedding dimension ($n_d$) equals 3. The embedding dimension is used in the following Fitness Function:

$$F(d, n_d) \propto \frac{\sigma_d}{\mu_d},$$

where d denotes a distance from center to the phase space trajectory, $\sigma_d$ denotes variance in the distance from the attractor to the trajectory, and $\mu_d$ denotes the mean distance from the attractor to the trajectory.

FIG. 4A is a graph 400 illustrating the periodic function 402 being plotted against time 404. Alternatively and as shown in FIG. 4B, when the PSR is plotted 406, it can be seen that the trajectory traces a ring 408 in 3D. The centroid of the ring 408 forms the attractor for P(t). An important point to observe is that the future (T=k) location of the trajectory is predictable from the present (T=0) and past observations of the phase space.

Figure 5:
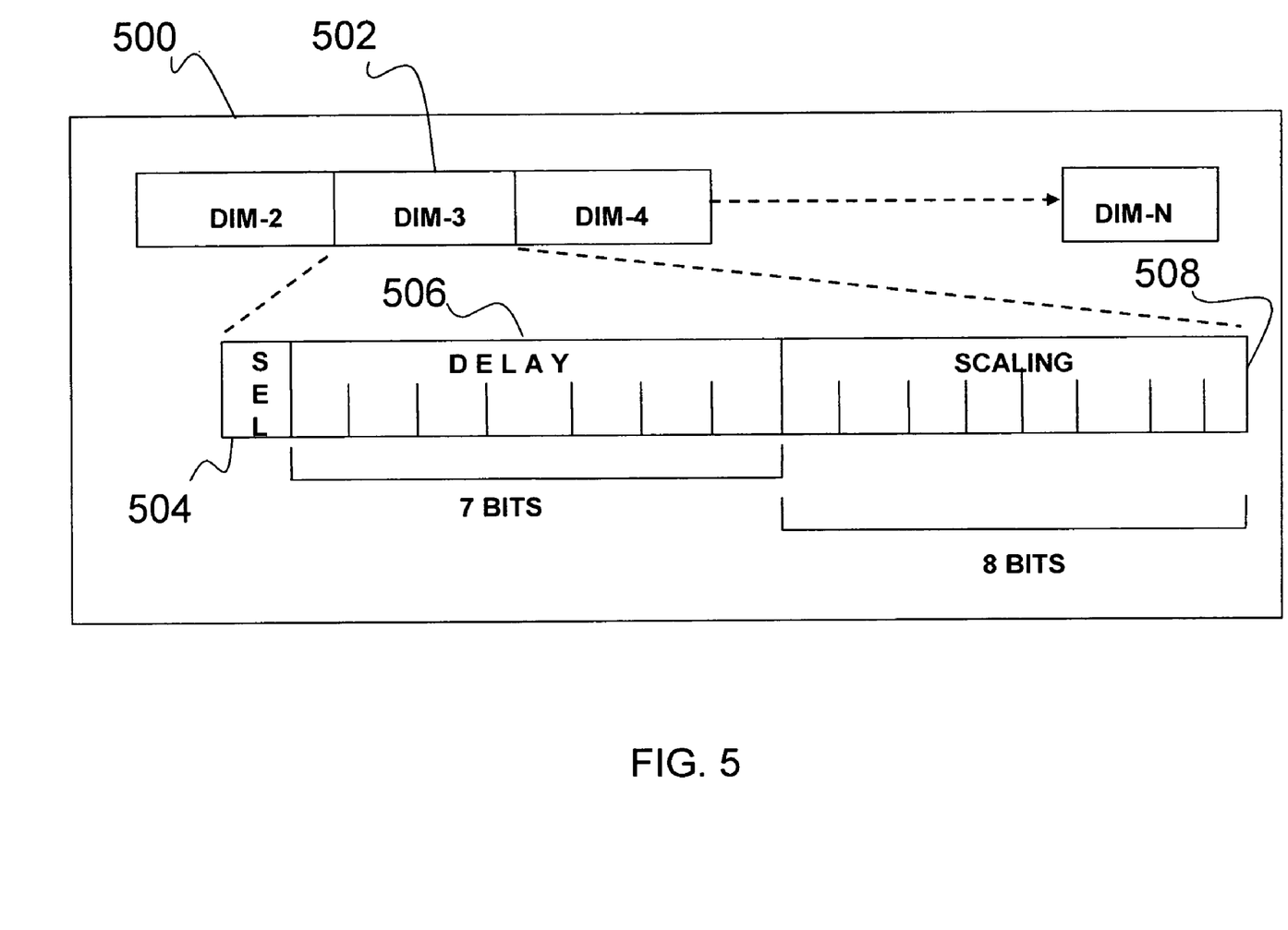
FIG. 5 is an illustration of a GA chromosome that encodes parameters for time embedding.

FIG. 5 is an illustration of a GA chromosome 500 that encodes the parameters to search for in the time embedding problem. There are three parameters that are encoded in the example chromosome 500. They are the number of past (historical) samples N 502, the delays, and scale for these samples. The number of past samples 502 is encoded by using an N 16-bit chromosome. A single bit within each 16-bit chromosome called the SEL bit 504 is used to select or not select that particular past sample. The remaining 15 bits are partitioned into two parts: a 7 bit-delay portion 506 and an 8-bit scale portion 508. The delay information is encoded as a 7-bit number to amount to a maximum delay of 127 past samples. The scale parameter for each selected past dimension is encoded with eight bits, with four for the integer part and the remaining four for the floating point part. Thus, the scale ranges between [$\frac{1}{16}$, $15\frac{15}{16}$]. The search then proceeds to arrive at an optimal set of parameters using the Fitness Function listed above. The Fitness Function is the ratio of variance in the distance from the attractor to the phase space trajectory over the mean distance of the trajectory from the attractor. The GA essentially rewards solutions that minimizes this ratio or maximizes its inverse. For the non-limiting example listed above, the GA estimates a 3D phase space representation (i.e., N=3) with the estimated scale parameters being {1, 7.3125, 8.6875} and the three delays are {0, 10, 86}.

(4.2) Mapping Module

The mapping module (element 304 of FIG. 3) is used for function mapping from the phase space to an original function space. In other words, the mapping module maps the deterministic features to a predicted $\hat{x}(n+1)$ sample of the time series.

For a function $x(t) \in R$, letting $P=\{S_i\}_{i=1}^m$ be its phase space representation (PSR), where $S_i$, i=1, . . . , m, are state variables. Additionally, m is an embedded dimension and R is the set of all real numbers. As described above, for a given time sequence $\{x(k)\}_{k=1}^n$, its PSR can be estimated using the PSR extraction technique (i.e., the extraction module). The estimated PSR is given by:

$$P_n = \{\hat{S}_i(n) = w_i x(n-d_i)\}_{i=1}^m, \qquad (1)$$

where $w_i$ is a weight factor and $d_i$ is a delay factor.

In order to predict $\hat{x}(n+1)$, a mapping function $G(P)$ must first be identified to map the PSR to the original function space. That is, $$G: P_n \in R^m \to \hat{x}(n+1) \in R. \qquad (2)$$

Figure 6:
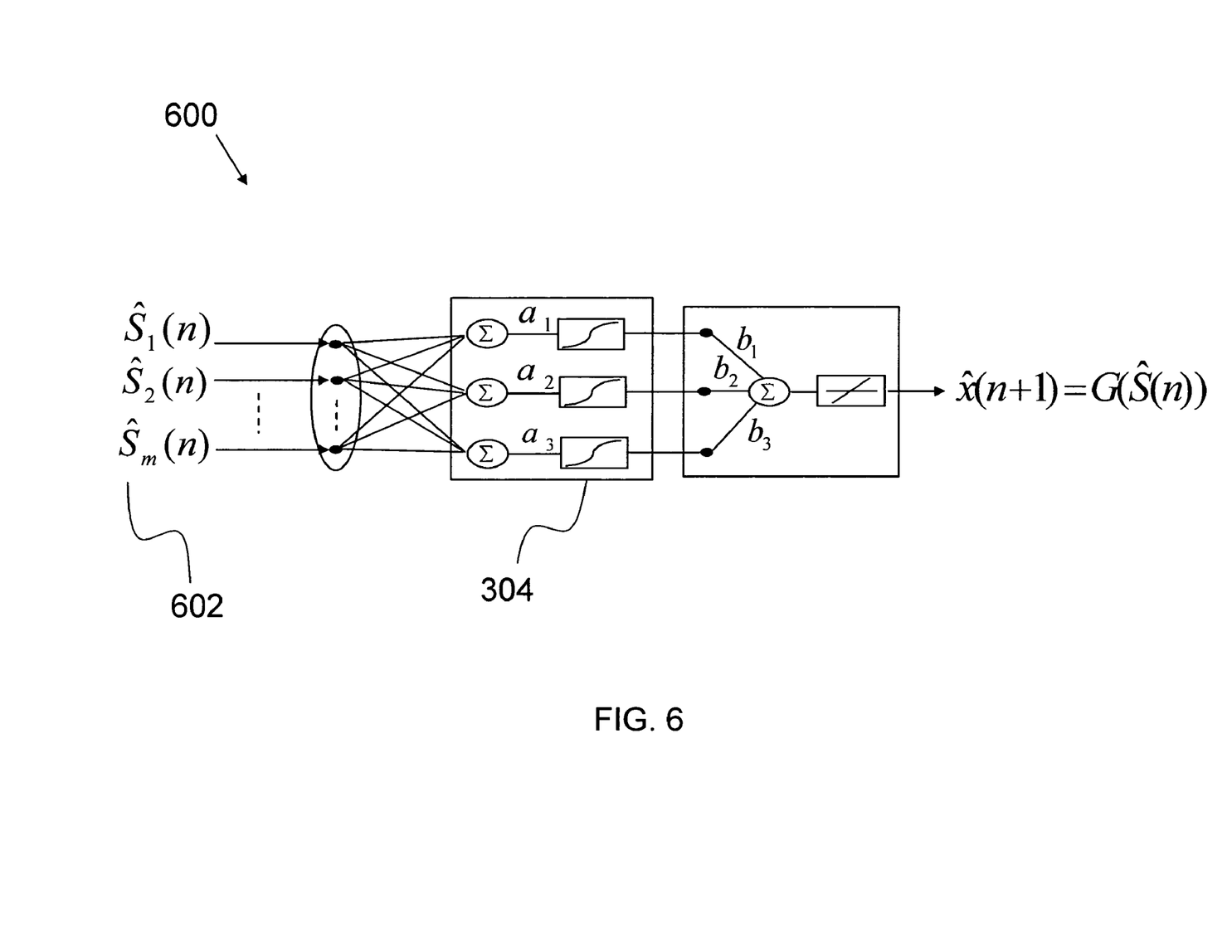
FIG. 6 is a flow chart illustrating a mapping network with three layers.

If $x(t)$ is a nonlinear dynamic signal, the mapping function $G(P)$ is a nonlinear mapping. A multi-layer feed-forward neural network is used to approximate the mapping function. As a non-limiting example, FIG. 6 illustrates a three layer neural network 600 to approximate $G(P)$. The training process that uses some techniques to train the neural network determines the parameters of the mapping module 304. The training process basically uses the PSR vector S 602 as inputs and the corresponding signal $x(k)$ as outputs and then trains a typical neural network to learn to transform the PSR to the original space.

(4.3) Prediction Module

The prediction module (item 306 of FIG. 3) is configured to utilize a cascaded computing structure having k levels of prediction to generate a predicted $\hat{x}(n+k)$ sample.

Generally, there are two kinds of approaches that can be used to make multi-step predictions, a model-based approach and neural network/fuzzy inference approach.

In the model-based approach, if a user can obtain the model/function of observed signals, the model/function can be used to make any arbitrary step predictions. This method, however, cannot be easily used in the prediction of nonlinear dynamic signals because of the lack of signal models/functions.

The other approach uses neural networks/fuzzy inference systems to approximate nonlinear mapping functions. Such systems have been referred to as ANFIS and DENFIS systems, as described above. In these methods, the nonlinear mapping networks can only be trained for a specific prediction step. Thus, for a different prediction step, the mapping networks have to be retrained for prediction.

The present invention improves upon the prior art with a computing structure that can achieve multi-step predictions without retraining the mapping network. A k-step forward-prediction uses the following:

$\hat{x}(n+k) = G(P_{n+k-1})$ and $P_{n+k-1} = \{w_i x(n+k-1-d_i)\}_{i=1}^m$. The parameters $\{w_i, d_i, m\}$ are independent of prediction horizon. In order to estimate $P_{n+k-1}$, a data sequence up to $x(n+k-1)$ is required. Since $x(n+1)$ to $x(n+k-1)$ are not available at time n, estimated values are used to replace them. That is, $$P_{n+k-1} = \{w_i x(n+k-1-d_i) : x(v) = \hat{x}(v), v = n+k-1-d_i \geq 1\}_{i=1}^m. \qquad (3)$$

Figure 7:
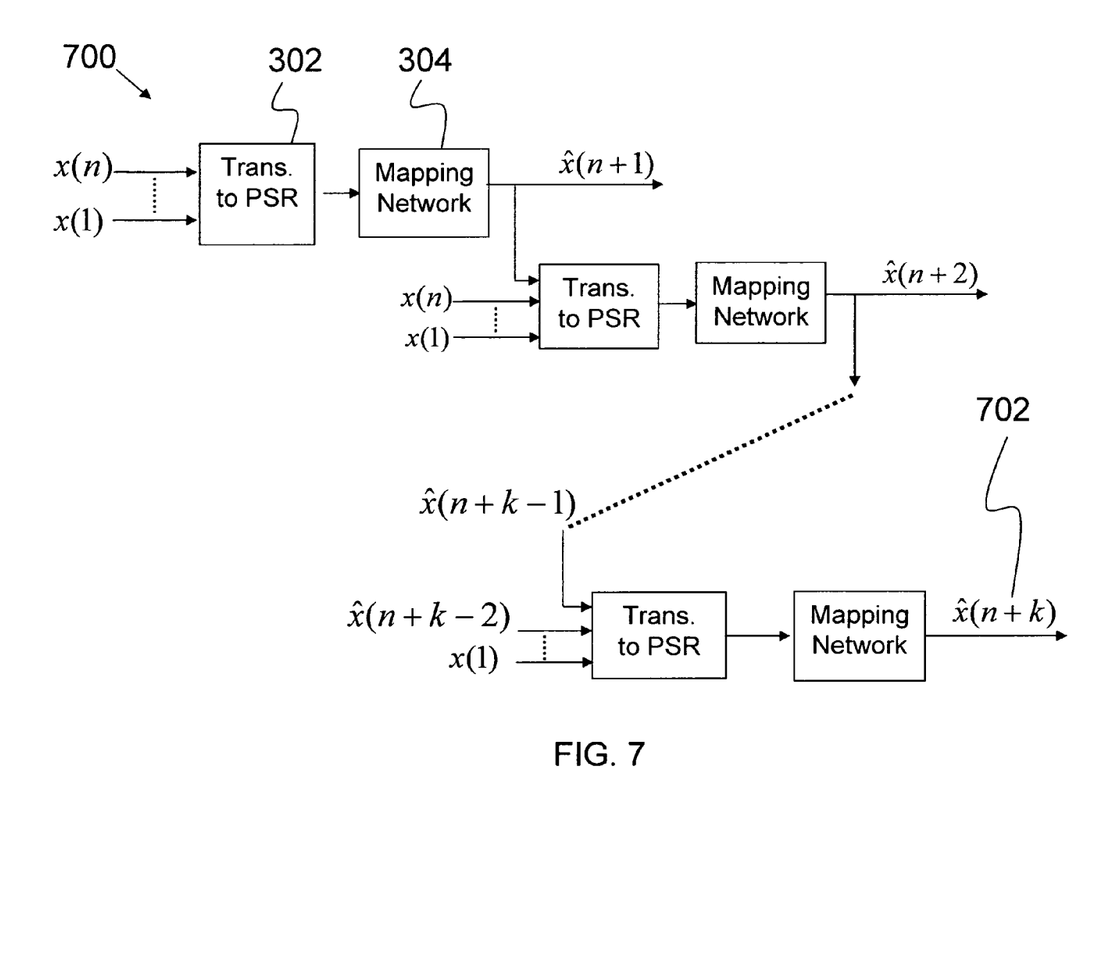
FIG. 7 is a flow chart illustrating a computing structure for a k-step prediction.

As shown in FIG. 7, the present invention includes a cascaded computing structure 700 to achieve multi-step predictions 702. The computing structure 700 includes an extraction module 302 to transform data observations/data estimations into their PSR based on equation (3) above. The mapping module 304 is used to map the PSRs into the original function using the neural network described above.

Thus, each of the k levels of prediction is configured to receive the X(1) through X(n) historical samples and the past $\hat{x}(n+1)$ sample through a $\hat{x}(n+k-1)$ sample. The prediction module further utilizes the extraction module and mapping module to generate a predicted $\hat{x}(n+k)$ sample. The predicted $\hat{x}(n+k)$ sample is the final temporal prediction for k future samples.

An advantage of the cascaded computing structure 700 is to make multi-step predictions without retraining the network. The experimental results below show that the present invention is effective for predicting nonlinear dynamic signals and performs better than existing techniques.

(5) Experimental Results

To evaluate the present invention, a Mackey-Glass (MG) time series was generated. An MG time series is commonly used in the performance evaluation for the prediction of nonlinear dynamic signals. The MG time series is defined by $$\dot{x}(t) = \frac{0.2 x(t-\tau)}{1 + x^{10}(t-\tau)} - 0.1 x(t), \qquad (4)$$

where $\tau$ is a delay constant. In the simulation, $\tau$ was set as follows: $\tau=17.0$. 2000 samples of the MG time series were generated and 1000 samples were used for extracting the phase space representation (500 samples for training the neural network and 500 samples for testing the prediction).

The non-dimensional error index (NDEI) was used as a measure of prediction accuracy. It is defined by the following equation:

$$NDEI = \frac{\sqrt{\frac{1}{N} \sum_{i=1}^N (x_i - \hat{x}_i)^2}}{\sigma_x}, \qquad (5)$$

where $\sigma_x$ is the standard deviation of the data $x(t)$. In this experimental implementation, three layers were used (three neurons in the first layer, six neurons in the second layer and one neuron in the third layer) in the mapping neural network. The neural network was trained using a back-propagation (BP) technique.

Figure 8:
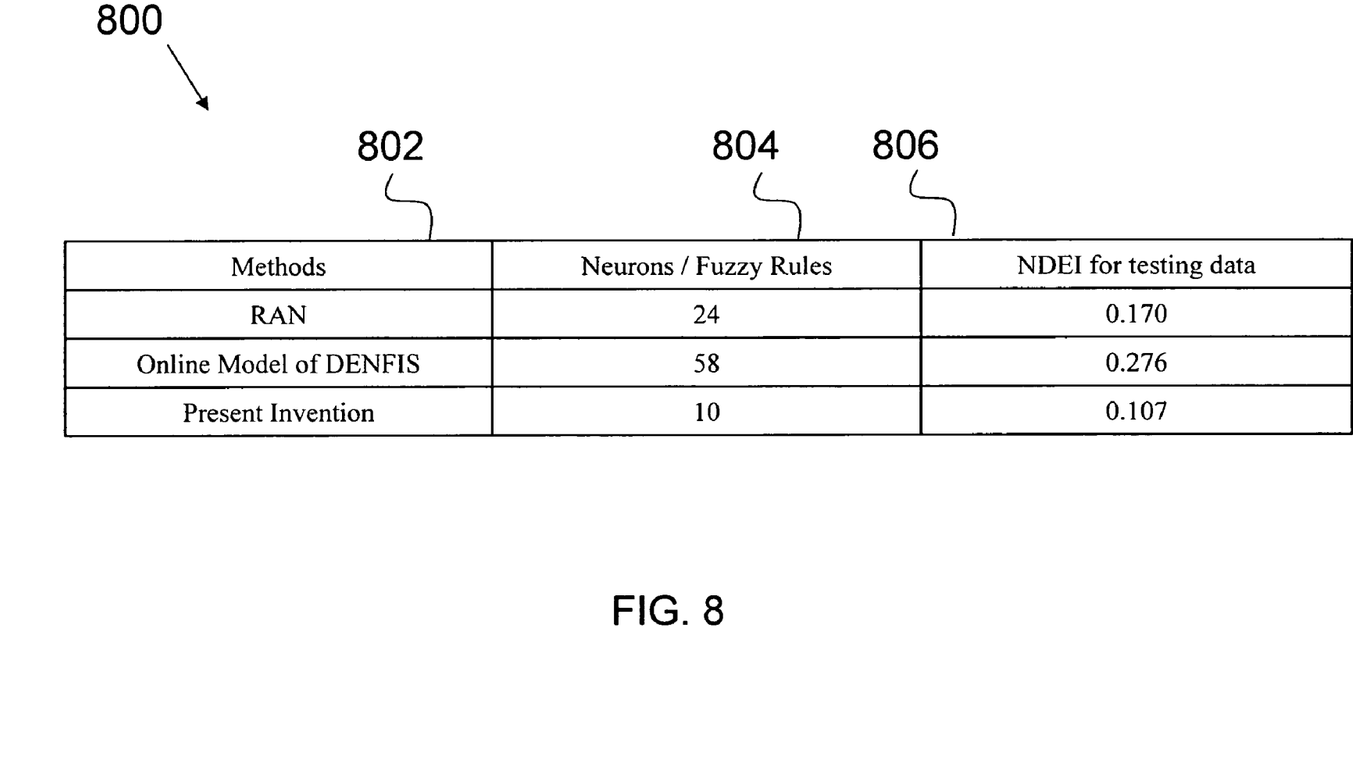
FIG. 8 is a table illustrating prediction results on Mackey-Glass (MG) test data.

The results were compared to the results produced by the online model of DENFIS (described above) and RAN (as described by J. Platt in "A Resource Allocating Network for Function Interpolation," *Neural Computing*, vol. 3, pp. 213-225, 1991). The results were compared with those of DENFIS and RAN because they have a computational complexity that is similar to the present invention. The comparison is summarized in the table 800 of FIG. 8. The table 800 compares the various methods 802, their respective number of neurons per fuzzy rules 804, and the corresponding NDEI for the testing data 806. As illustrated, the prediction accuracy was best for the present invention (as it resulted in the lowest NDEI).

Figure 9A:
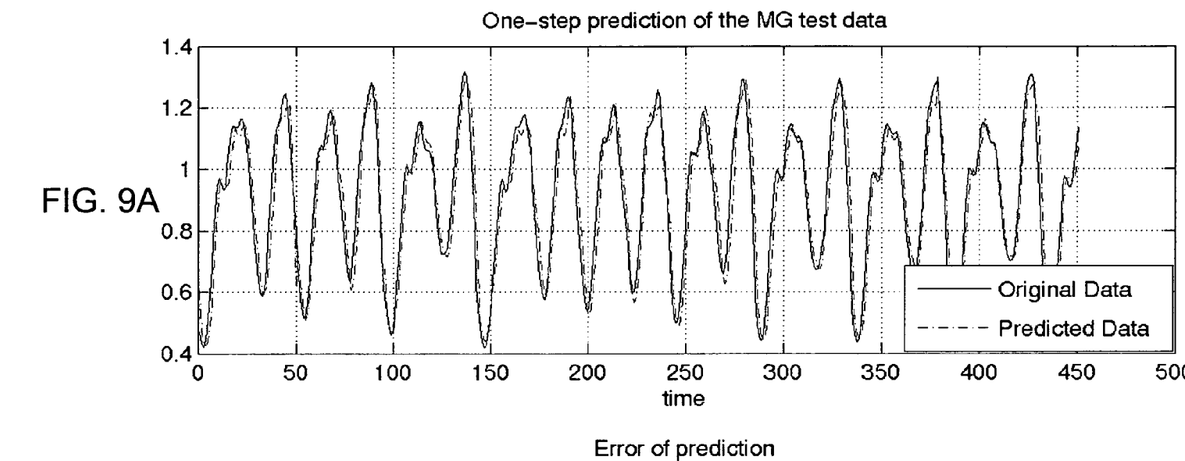
FIG. 9A is a chart illustrating a one-step prediction of the MG test data.
Figure 9B:
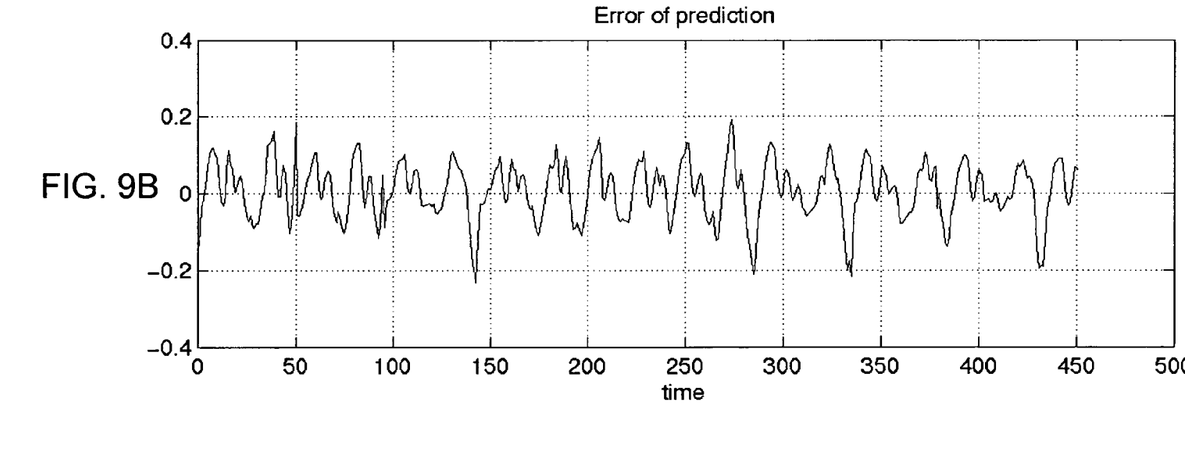
FIG. 9B is a chart illustrating the error of prediction as related to the data illustrated in FIG. 9A.
Figure 10A:
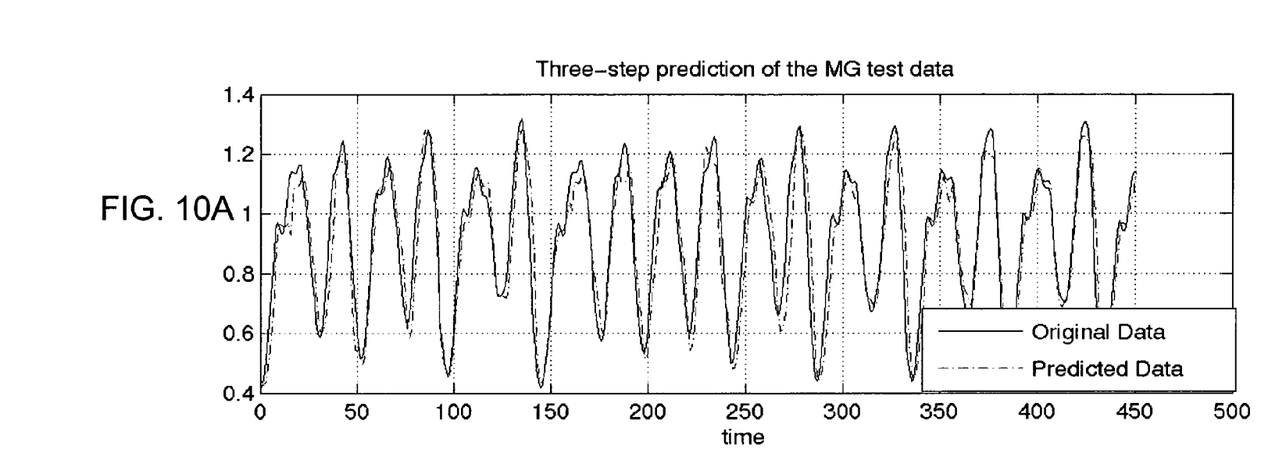
FIG. 10A is a chart illustrating a three-step prediction of the MG test data using a cascaded computing structure.
Figure 10B:
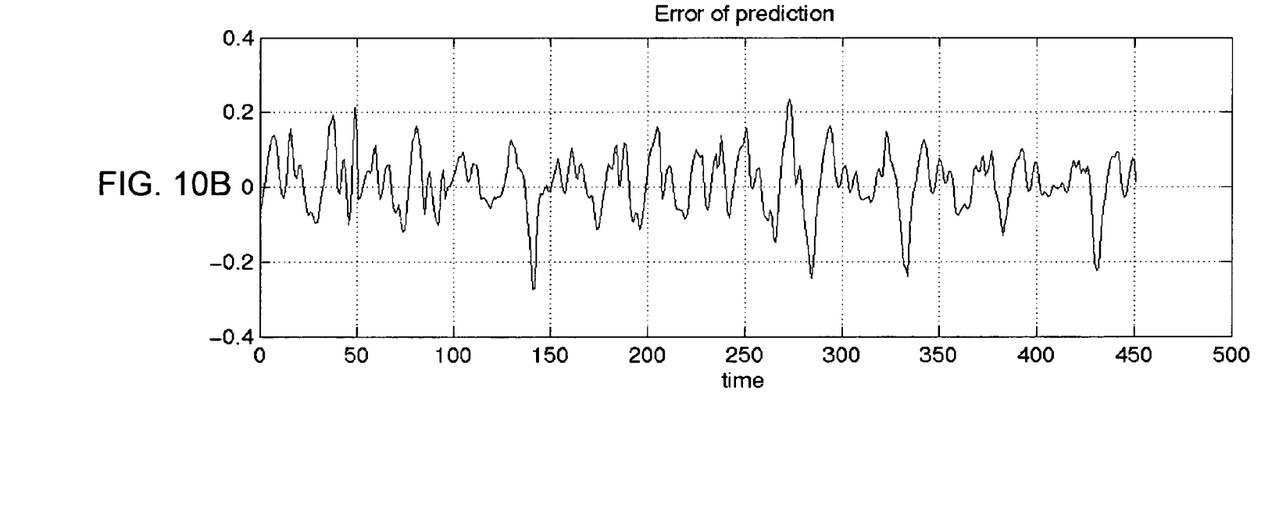
FIG. 10B is a chart illustrating the error of prediction as related to the data illustrated in FIG. 10A.
Figure 11A:
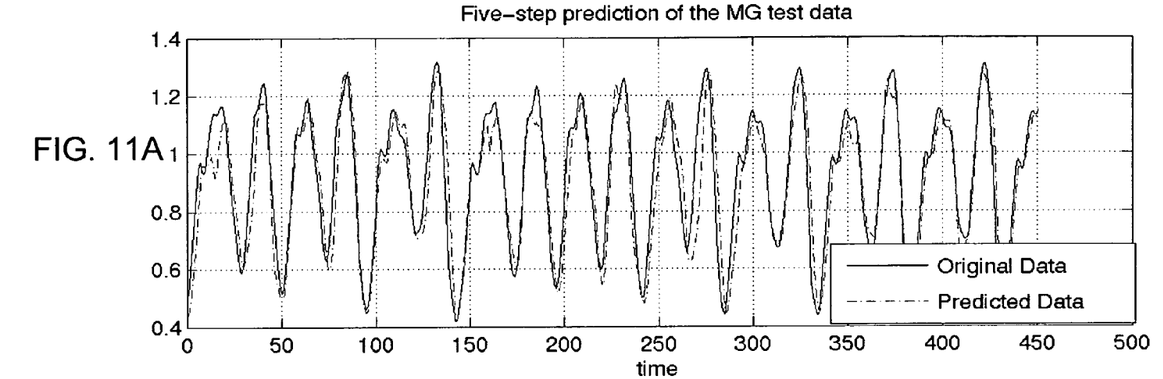
FIG. 11A is a chart illustrating a five-step prediction of the MG test data using a cascaded computing structure.
Figure 11B:
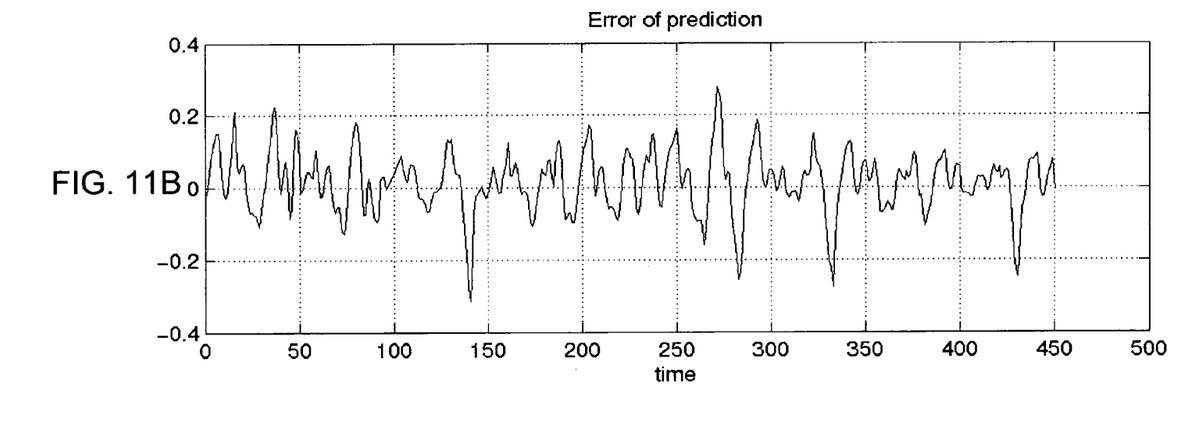
FIG. 11B is a chart illustrating the error of prediction as related to the data illustrated in FIG. 11A.

FIGS. 9A through 11B illustrate various prediction results and their corresponding errors of prediction. FIG. 9A is a graph illustrating original data and the corresponding one-step predicted data of the MG test data, where the network was trained once for the prediction. FIG. 9B is a graph illustrating the error of prediction for the predicted data illustrated in FIG. 9A. FIG. 10A is a graph illustrating original data and the corresponding three-step predicted data of the MG test data, where the network was trained once for the prediction. FIG. 10B is a graph illustrating the error of prediction for the predicted data illustrated in FIG. 10A. FIG. 11A is a graph illustrating original data and the corresponding five-step predicted data of the MG test data, where the network was trained once for the prediction. FIG. 11B is a graph illustrating the error of prediction for the predicted data illustrated in FIG. 11A. As illustrated in FIGS. 9A through 11B, the predicted data is very close to the original data.

(6) Conclusion

The present invention provides a new technique for signal prediction. The technique uses a nested genetic algorithm to extract phase space representations from observed time series of signals, and uses a neural network as nonlinear mapping function to map the phase space representations of the signal back to original functional space for prediction of the signals. Additionally, the present invention presents a novel cascaded-computing structure that can achieve multi-step predictions without retraining the nonlinear mapping network. The simulations show that the technique is effective to predict nonlinear dynamic signals and can achieve comparatively better prediction results compared to the state of the art. Thus, the cascaded computing structure can produce good prediction results for the multi-step predictions of nonlinear dynamic signals.

What is claimed is:

1. A system for temporal prediction, comprising one or more processors having:
   an extraction module, the extraction module being configured to receive $X(1), \ldots, X(n)$ historical samples of a time series and utilize a search and optimization algorithm to extract deterministic features in the time series, wherein the deterministic features are phase-space representations (PSR) of the time series;
   a mapping module, the mapping module being configured to receive the deterministic features and utilize a learning algorithm to map the deterministic features to a predicted $\hat{x}(n+1)$ sample of the time series; and
   a prediction module, the prediction module being configured to utilize a cascaded computing structure having k levels of prediction to generate a predicted $\hat{x}(n+k)$ sample, the predicted $\hat{x}(n+k)$ sample being a final temporal prediction for k future samples,
   wherein the prediction module is configured to utilize a cascaded computing structure having k levels of prediction, wherein each level of prediction is configured to receive the $X(1)$ through $X(n)$ historical samples and the past $\hat{x}(n+1)$ sample through a $\hat{x}(n+k-1)$ sample, and wherein the prediction module further utilizes the extraction module and mapping module to generate a predicted $\hat{x}(n+k)$ sample, the predicted $\hat{x}(n+k)$ sample being a final temporal prediction for k future samples; and
   wherein $\hat{x}(n+k)=G(P_{n+k-1})$ and $P_{n+k-1}=\{w_i x(n+k-1-d_i)\}_{i=1}^m$, where $w_i$ is a weight factor, $d_i$ is a delay factor, and m is an embedded dimension, with parameters $\{w_i, d_i, m\}$ being independent of prediction horizon.

2. A system as set forth in claim 1, wherein the extraction module is configured to extract the deterministic features as a multi-dimensional feature subset using the search and optimization algorithm, wherein each subset is extracted according to how many past samples are needed, a relative time sample number of each of the past samples with respect to a current time sample, and a weight of each of the past samples.

3. A system as set forth in claim 2, wherein the mapping module is configured to use the deterministic features from the extraction module to construct a training set having elements, where each element in the training set comprises the multi-dimensional feature subset and a corresponding next sample from the known historical time series, and being further configured to use the training set to train the mapping module to transform the deterministic features into the predicted $\hat{x}(n+1)$ sample of the time series.

4. A system as set forth in claim 3, wherein the learning algorithm is a neural network.

5. A system as set forth in claim 4, wherein the search and optimization algorithm is a genetic algorithm.

6. A system as set forth in claim 5, wherein the genetic algorithm is a nested genetic algorithm.

7. A system as set forth in claim 1, wherein the mapping module is configured to use the deterministic features from the extraction module to construct a training set having elements, where each element in the training set comprises the multi-dimensional feature subset and a corresponding next sample from the known historical time series, and being further configured to use the training set to train the mapping module to transform the deterministic features into the predicted $\hat{x}(n+1)$ sample of the time series.

8. A system as set forth in claim 1, wherein the learning algorithm is a neural network.

9. A system as set forth in claim 1, wherein the search and optimization algorithm is a genetic algorithm.

10. A system as set forth in claim 9, wherein the genetic algorithm is a nested genetic algorithm.

11. A computer program product for temporal prediction, the computer program product comprising computer-readable instruction means encoded on a computer-readable medium that are executable by a computer for causing a computer to perform operations of:
    receiving $X(1), \ldots, X(n)$ historical samples of a time series and extracting deterministic features in the time series utilizing a search and optimization algorithm, wherein the deterministic features are phase-space representations (PSR) of the time series;
    mapping the deterministic features to a predicted $\hat{x}(n+1)$ sample of the time series utilizing a learning algorithm; and
    generating a predicted $\hat{x}(n+k)$ sample using a cascaded computing structure having k levels of prediction, the predicted $\hat{x}(n+k)$ sample being a final temporal prediction for k future samples,
    further comprising instruction means for causing a computer to operate as a cascaded computing structure having k levels of prediction, wherein each level of prediction is configured to receive the $X(1)$ through $X(n)$ historical samples and the past $\hat{x}(n+1)$ sample through a $\hat{x}(n+k-1)$ sample, and wherein the prediction module further utilizes the extraction module and mapping module to generate a predicted $\hat{x}(n+k)$ sample, the predicted $\hat{x}(n+k)$ sample being a final temporal prediction for k future samples; and
    wherein $\hat{x}(n+k)=G(P_{n+k-1})$ and $P_{n+k-1}=\{w_i x(n+k-1-d_i)\}_{i=1}^m$, where $w_i$ is a weight factor, $d_i$ is a delay factor, and m is an embedded dimension, with parameters $\{w_i, d_i, m\}$ being independent of prediction horizon.

12. A computer program product as set forth in claim 11, further comprising instruction means for causing a computer to extract the deterministic features as a multi-dimensional feature subset using the search and optimization algorithm, wherein each subset is extracted according to how many past samples are needed, a relative time sample number of each of the past samples with respect to a current time sample, and a weight of each of the past samples.

13. A computer program product as set forth in claim 12, further comprising instruction means for causing a computer to use the deterministic features from the extraction module to construct a training set having elements, where each element in the training set comprises the multi-dimensional feature subset and a corresponding next sample from the known historical time series, and further comprising instruction means to cause a computer to use the training set to train the mapping module to transform the deterministic features into the predicted $\hat{x}(n+1)$ sample of the time series.

14. A computer program product as set forth in claim 13, further comprising instruction means for causing a computer to use a neural network as the learning algorithm.

15. A computer program product as set forth in claim 14, further comprising instruction means for causing a computer to use a genetic algorithm as the search and optimization algorithm.

16. A computer program product as set forth in claim 15, further comprising instruction means for causing a computer to use a nested genetic algorithm as the genetic algorithm.

17. A computer program product as set forth in claim 11, further comprising instruction means for causing a computer to use the deterministic features from the extraction module to construct a training set having elements, where each element in the training set comprises the multi-dimensional feature subset and a corresponding next sample from the known historical time series, and further comprising instruction means to cause a computer to use the training set to train the mapping module to transform the deterministic features into the predicted $\hat{x}(n+1)$ sample of the time series.

18. A computer program product as set forth in claim 11, further comprising instruction means for causing a computer to use a neural network as the learning algorithm.

19. A computer program product as set forth in claim 11, further comprising instruction means for causing a computer to use a genetic algorithm as the search and optimization algorithm.

20. A computer program product as set forth in claim 19, further comprising instruction means for causing a computer to use a nested genetic algorithm as the genetic algorithm.

21. A method for temporal prediction, comprising acts of:
receiving $X(1), \ldots, X(n)$ historical samples of a time series and extracting deterministic features in the time series utilizing a search and optimization algorithm, wherein the deterministic features are phase-space representations (PSR) of the time series;
mapping the deterministic features to a predicted $\hat{x}(n+1)$ sample of the time series utilizing a learning algorithm; and
generating a predicted $\hat{x}(n+k)$ sample using a cascaded computing structure having k levels of prediction, the predicted $\hat{x}(n+k)$ sample being a final temporal prediction for k future samples,
operating a cascaded computing structure having k levels of prediction, wherein each level of prediction is configured to receive the $X(1)$ through $X(n)$ historical samples and the past $\hat{x}(n+1)$ sample through a $\hat{x}(n+k-1)$ sample; and
generating a predicted $\hat{x}(n+k)$ sample, the predicted $\hat{x}(n+k)$ sample being a final temporal prediction for k future samples; and
wherein $\hat{x}(n+k)=G(P_{n+k-1})$ and $P_{n+k-1}=\{w_i x(n+k-1-d_i)\}_{i=1}^{m}$, where $w_i$ is a weight factor, $d_i$ is a delay factor, and m is an embedded dimension, with parameters $\{w_i, d_i, m\}$ being independent of prediction horizon.

22. A method as set forth in claim 21, further comprising an act of extracting the deterministic features as a multi-dimensional feature subset using the search and optimization algorithm, wherein each subset is extracted according to how many past samples are needed, a relative time sample number of each of the past samples with respect to a current time sample, and a weight of each of the past samples.

23. A method as set forth in claim 22, further comprising acts of:
using the deterministic features from the extraction module to construct a training set having elements, where each element in the training set comprises the multi-dimensional feature subset and a corresponding next sample from the known historical time series; and
using the training set to train the mapping module to transform the deterministic features into the predicted $\hat{x}(n+1)$ sample of the time series.

24. A method as set forth in claim 23, further comprising an act for using a neural network as the learning algorithm.

25. A method as set forth in claim 24, further comprising an act of using a genetic algorithm as the search and optimization algorithm.

26. A method as set forth in claim 25, further comprising an act of using a nested genetic algorithm as the genetic algorithm.

27. A method as set forth in claim 21, further comprising acts of:
using the deterministic features from the extraction module to construct a training set having elements, where each element in the training set comprises the multi-dimensional feature subset and a corresponding next sample from the known historical time series; and
using the training set to train the mapping module to transform the deterministic features into the predicted $\hat{x}(n+1)$ sample of the time series.

28. A method as set forth in claim 21, further comprising an act of using a neural network as the learning algorithm.

29. A method as set forth in claim 21, further comprising an act of using a genetic algorithm as the search and optimization algorithm.

30. A method as set forth in claim 29, further comprising an act of using a nested genetic algorithm as the genetic algorithm.

* * * * *